Patented Sept. 9, 1924.

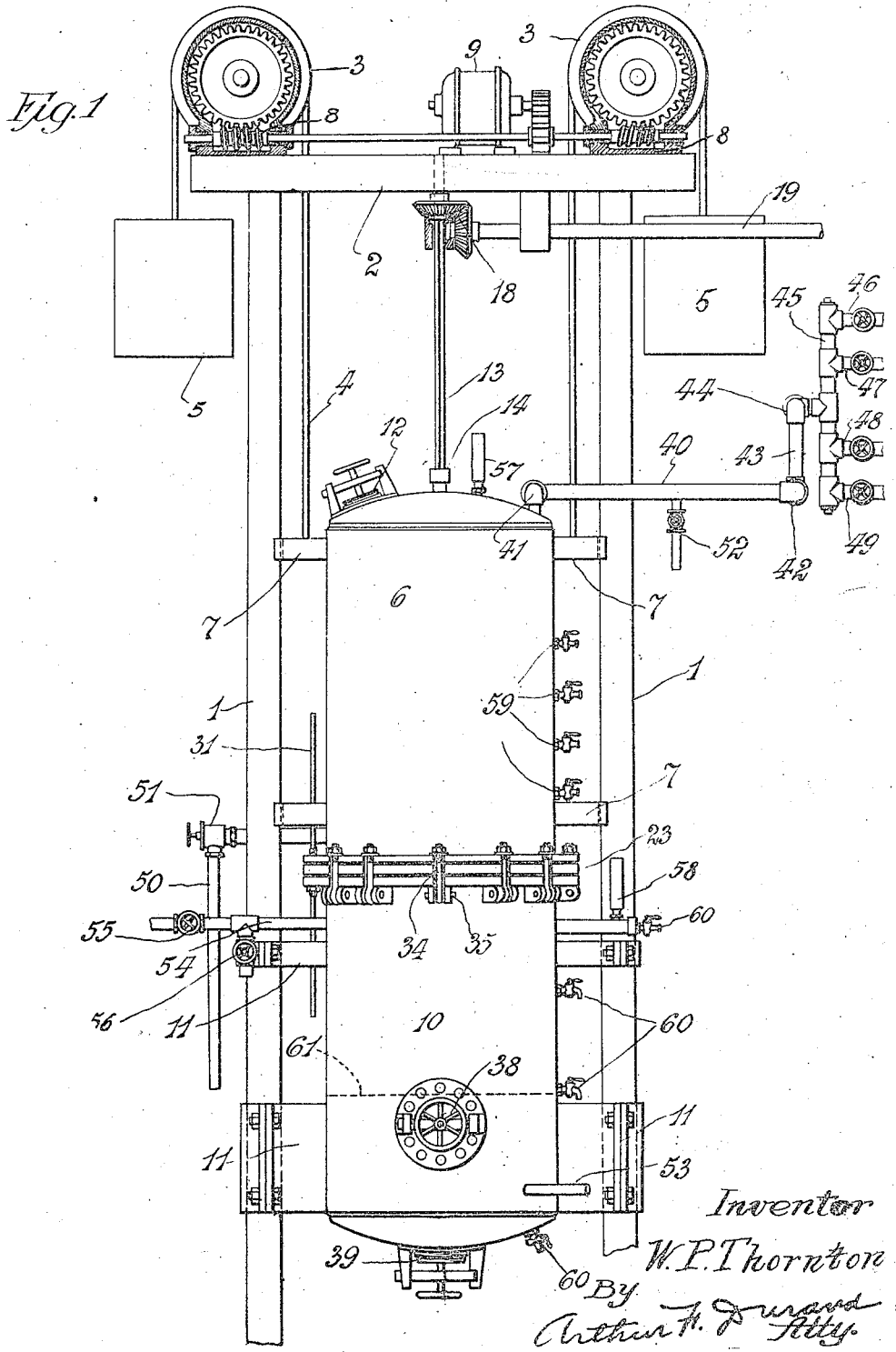

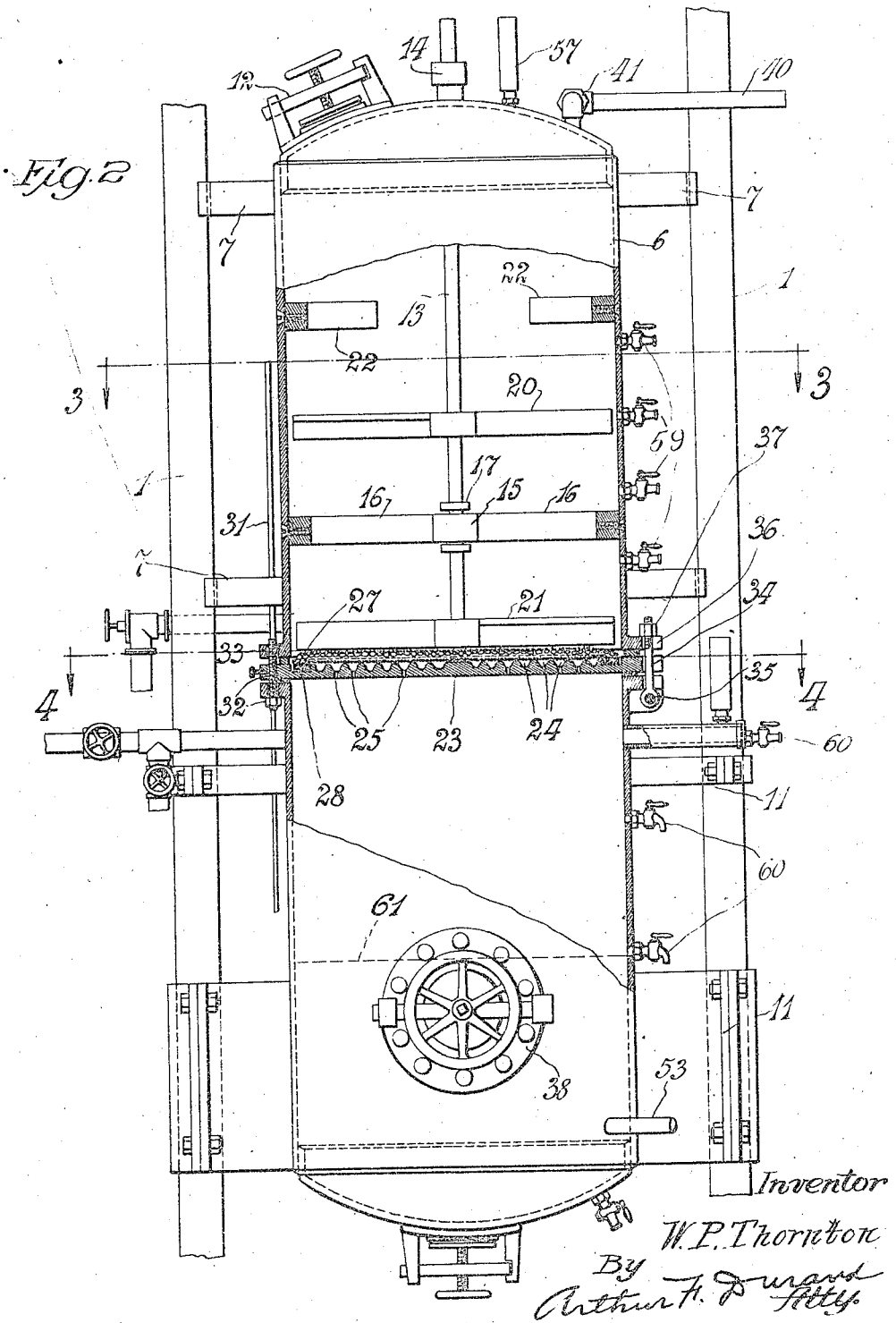

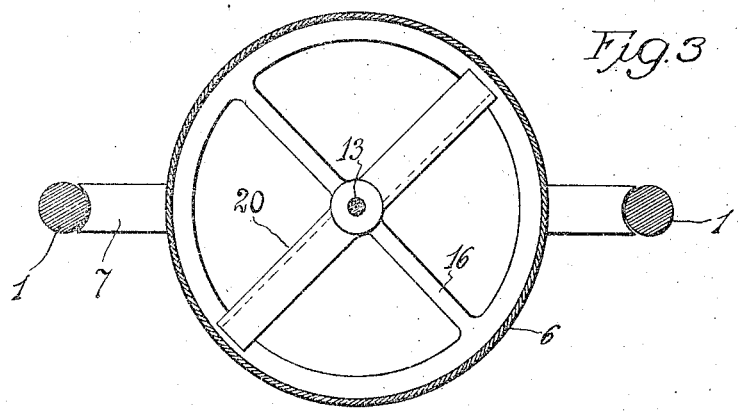
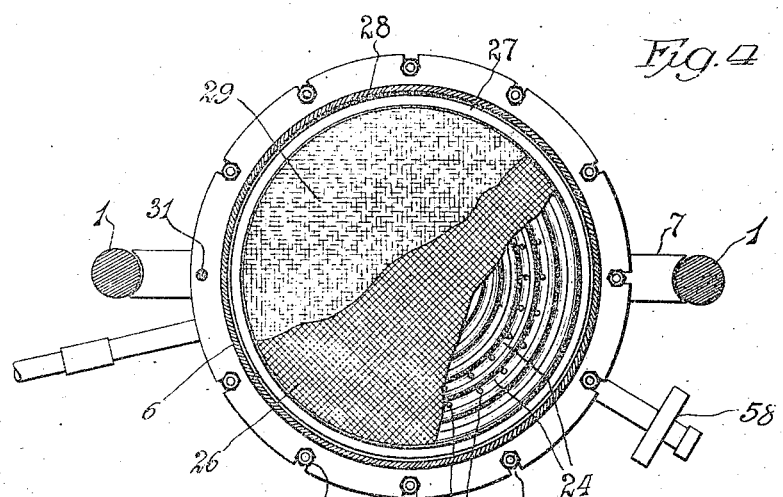
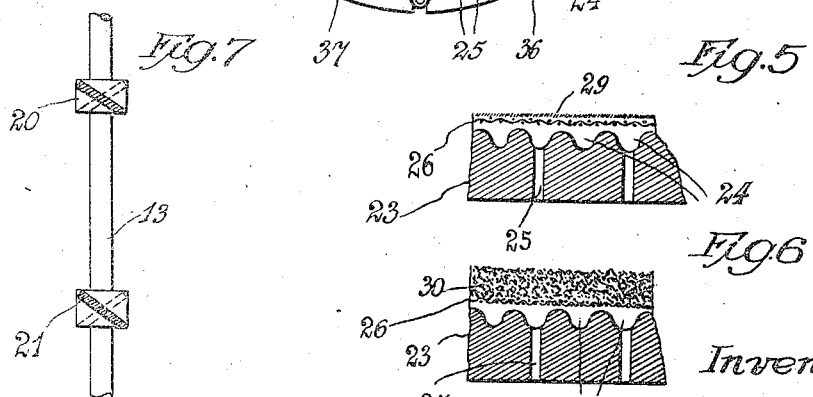
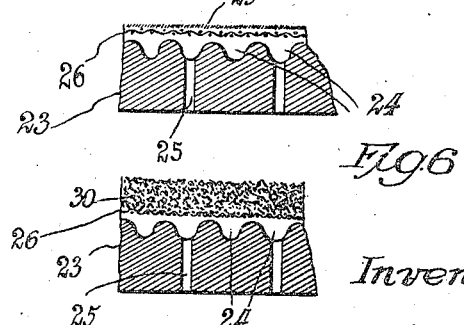

1,508,355

UNITED STATES PATENT OFFICE.

WILLIAM P. THORNTON, OF CHICAGO, ILLINOIS.

PROCESS OF AND APPARATUS FOR EXTRACTING SULPHUR FROM ORE.

Application filed March 24, 1919. Serial No. 284,780.

*To all whom it may concern:*

Be it known that I, WILLIAM P. THORNTON, a citizen of the United States of America, and a resident of Chicago, Illinois, have invented a certain new and useful Improvement in Processes of and Apparatus for Extracting Sulphur from Ore, of which the following is a specification.

This invention relates to the extraction of sulphur from ore, and the separation of sulphur from earthy substances. Various methods have been proposed and employed for this purpose, but the extraction of sulphur from ore and earthy substances is a more or less difficult thing, and the methods heretofore employed have not, it is found, been altogether satisfactory. Any process for the extraction of sulphur, in order to have commercial value, must not only be simple and economical, but must also be capable of extracting a large percentage of the sulphur from the ore and earthy substances. Some processes are fairly economical but are not efficient or effective; while other processes are effective, and therefore capable of extracting a large portion of the sulphur from the ore and earthy substances, but are not economical and are so costly that, in the long run, and for certain situations, they are not commercially practicable.

Generally stated, therefore, the object of the invention is to provide a novel and improved and comparatively simple and inexpensive method or process for extracting sulphur from ore, and for separating sulphur from dirt or sediment or earthy substances with which it may be found, and to provide an efficient and fairly economical process which can be employed in the commercial production of sulphur to better advantage than the methods heretofore used for this purpose.

It is also an object to provide novel and improved apparatus for use in practicing or carrying out the process in accordance with the invention, and to provide certain details and features of construction which will tend to increase the general efficiency and the desirability of an apparatus of this particular character.

To these and other useful ends, the invention consists in matters hereinafter set forth and claimed, and shown in the accompanying drawings, in which—

Fig. 1 is a front elevation of an apparatus embodying the principles of the invention.

Fig. 2 is an enlarged front elevation of the pressure chamber which forms a part of said apparatus, showing the same broken away and in section to some extent, thereby to bring into view the agitator and filter which are enclosed in said chamber.

Fig. 3 is a horizontal section on line 3—3 in Fig. 2.

Fig. 4 is a horizontal section on line 4—4 in Fig. 2, showing certain portions of the filter broken away to illustrate the construction thereof.

Fig. 5 is an enlarged detail sectional view of a portion of the filter.

Fig. 6 is a similar view showing a different form of filter.

Fig. 7 is an enlarged side elevation of the agitator which is enclosed in the upper compartment of the pressure chamber, showing the slant or angle of the blades thereof.

As thus illustrated, the apparatus comprises a pair of upright guides or tracks 1—1 which may be of any suitable form or character, and which can be supported at their lower ends, in any suitable manner. The upper ends of said guides are connected together by a horizontal member 2 upon which are mounted the drums 3 that carry the lifting cables 4, the latter being provided with weights 5 to counter-balance the upper section 6 of the pressure chamber, which latter is provided with laterally projecting portions 7 which engage the guides, and to which the lower ends of the cables are attached. Said drums 3 are operated in any suitable or desired manner, as for example by the worm gearing 8 which is driven by the motor 9 through suitable connections.

Said pressure chamber comprises, also, a lower section 10 which is stationary and supported in any suitable or desired manner on the guides 1, as by brackets 11, which rigidly connect the lower section 10 of the pressure chamber to said guides. The top of the upper section 6 is provided with an inlet having a hand-hole plate 12 movably applied thereto in any suitable manner, so that a closure is formed for the inlet to prevent the escape of the pressure while the apparatus is in operation, but which can be readily removed to permit the introduction of the ore into the top of the chamber. The agitator enclosed in the chamber comprises a vertical shaft 13 which extends downwardly through a stuffing box 14 in the top of the chamber, and through a bearing 15 on the cross bar 16, which latter is secured horizontally within the upper compartment of the pressure chamber. Collars 17 may be provided above and below the bearing 15 on said shaft, to hold the latter against up and down movement relatively to the chamber. This shaft is driven by a bevel gearing 18 suitably supported below the upper portion 2 of the frame formed by the upright guides 1, and the portion of the shaft 13 above the stuffing box 14 is squared to slide up and down in said gearing, so that the upper section 6 of the chamber can be raised and lowered. A shaft 19, or any suitable means, can be employed for transmitting power to said bevel gearing 18 to drive the agitator. Said shaft 13 is provided with laterally extending arms 20 above the bearing 15, and with similar arms 21 below said bearing, these arms being beveled or turned at an angle to provide them with sloping surfaces which will raise the ore contained in the chamber, when the shaft is rotated. The cross-bar 16 is formed in a similar manner, except that its two portions are beveled or sloped in a direction opposite to that of the revolving arms 20 and 21, so that they will raise the ore or materials if the entire mass is turned or rotated to some extent by the rotation of the agitator. Upper stationary bars 22 are secured to the walls of the chamber, above the revolving arms 20, and these arms 22 may be beveled or sloped like the two portions of the bar 16, whereby each arm 22 will also serve to raise and break up the mass of ore or materials during the operation of the agitator.

The filter which is interposed between the upper and lower compartment of the pressure chamber can be of any suitable character, but preferably comprises a plate 23 having concentric grooves 24 therein, and provided with openings 25 through which the water and melted sulphur will escape downwardly, as hereinafter explained. It will be understood, however, that these grooves can be arranged parallel in any suitable manner. Over this plate is placed a sheet of wire cloth 26, as shown more clearly in Figs. 4 and 5, of any suitable character, which is held down by a ring 27 which rests in the annular groove 28 formed in the plate. For example, this wire cloth may be of about ten mesh and constructed from No. 17 wire, but the character of the wire cloth can be changed or varied to suit the requirements. Over this comparatively coarse mesh screen 26 some form of straining medium is preferably provided, such as fine wire gauze or cotton cloth, such as the cloth 29 shown in Fig. 5; and it has also been found that a layer of sand and gravel 30, as shown in Fig. 6, spread over the wire cloth, will in some cases serve as an effective filtering medium, the purpose being to permit the melted sulphur and hot water to escape downwardly through the filter, leaving the ore and the earthy substances in the upper chamber, as will hereinafter more fully appear. Cotton cloth covered with a layer of gravel may also be employed. The filter thus constructed is held in place on the top of the lower section 10 of the pressure chamber by the vertically disposed rod 31 which is loosely held in one side of the lower section 10, and which extends upwardly through an opening 32 in the filter plate, being threaded in this opening, and also through the guide opening 33 in the lower rim portion of the section 6 of the pressure chamber, whereby the section 6 slides up and down on the rod 31. Thus the rod holds the filter plate down in place, when the upper section 6 is raised, but by removing the nut 32 from the lower portion of the threaded part of the rod and applying it to the upper portion thereof, so that the nut will rest on the flange of the section 6, the filter can then be raised with the section 6, the lower portion of said rod sliding upward in the opening in the flange of the section 10, as will be plain from the drawings; and, if desired, a set screw can be inserted, as shown, to hold the rod firmly in the filter plate. A locking bolt 34 is pivoted at 35 on the lower section 10 of the pressure chamber, and is adapted to be swung upwardly into the notch 36 formed in the lower rim portion of the upper section 6 of the pressure chamber, and by tightening the nut 37 on the upper end of the bolt, so as to draw the upper section 6 downwardly, the filter plate will be tightly clamped between the lower end of the upper section 6 and the top of the section 10, it being understood that several of these bolts 34 are provided at intervals around the circumference of the pressure chamber, as shown in Fig. 1, whereby no leakage will occur when the pressure within the chamber is raised to the desired point. The lower section 10 is provided on its side with a removable hand-hole plate 38 of any suitable character, and the bottom of the section 10 is also provided with a removable hand-hole plate 39, whereby access may be had to the lower compartment of the pressure chamber for any desired purpose. The top of the pressure chamber is provided with an inlet pipe 40 which has a swivel joint 41 that permits the section 6 of the chamber to be moved up and down, a similar swivel joint 42 being provided at the other end of this pipe, and the joint 42 being connected by a pipe 43 with another swivel joint 44 which connects with the main header 45 to which the pipes 46, 47, 48 and 49 lead to supply, respectively, air, steam, hot water and cold water, each of these four last mentioned pipes being provided, of course, with a valve to control the discharge into the header, and from the latter into the top of the pressure chamber. A blow-off pipe 50 having a valve 51 is connected to the lower portion of the upper section 6, and a blow-off cock 52 is applied to the pipe 40 to relieve the pressure in the upper compartment of the pressure chamber when such is necessary or desirable. A cold water pipe 53 leads to the bottom of the lower section 10 of the pressure chamber, and is preferably so placed that it is tangential, and causes a whirling motion of the water in the bottom portion of the chamber, thereby to wash out the contents of the chamber after the operations are completed; and a steam pipe 54, having a valve 55 and a blow-off 56, is connected to the upper portion of the lower section 10 of the pressure chamber. A thermometer 57 is applied to the top of the section 6, and a thermometer 58 is suitably applied to the upper portion of the section 10, so that the temperature in the upper compartment of the pressure chamber, as well as in the lower compartment, will always be indicated. The pressure chamber is provided at different heights with cocks 59 for the upper section 6, and at 60 for the lower section 10, and these are used for testing the water level and for drawing off the liquid contents of the upper and lower compartments, when such is desirable or necessary.

With the apparatus thus constructed, the process or method of employing the same for extracting sulphur from ore is preferably as follows:— The hand-hole plate 12 is removed and a suitable quantity of sulphur ore is placed in the upper compartment of the pressure chamber, upon the filter, and the hole is then closed. The ore may be of any suitable character, and in practice all sizes have been used from forty mesh to lumps as large as a hazel nut, or even a little larger. Through the pipe 53 cold water is pumped into the chamber or compartment within the section 10 to the level indicated by the dotted line 61, so that the lower chamber is about a quarter or a third full, leaving room in the section 10 for practically all of the hot water that passes through the filter. Then, through the pipe 40, hot water is discharged onto the ore, this water being preferably maintained at a temperature of from two hundred and fifty-six to two hundred and fifty-eight degrees Fahrenheit, or perhaps from two hundred and forty-five to two hundred and sixty-five degrees Fahrenheit, depending somewhat upon the character of the ore, so that it will melt the sulphur contained in the ore. Should the water be colder than this, it may be heated by the admission of steam through pipe 54. The steam passes into the lower section 10 of the pressure chamber and up through the screen 26 and straining medium 29 into the ore and water in the upper section 6 of the pressure chamber and heats the filter and raises the temperature of the ore and water above. Passing the steam through the straining medium also cleans the straining medium by removing from it small particles of matter which would serve to clog it. Also, steam may be admitted through the pipe 40 to the upper compartment of the pressure chamber, also through 54, and before hot water is admitted, to preliminarily heat the interior of the chamber and to heat the ore, thereby to assist or facilitate the separation of the sulphur from the ore. Before, or during this steaming operation, the cold water may be pumped through the pipe 53 into the lower compartment of the pressure chamber, to the proper level, as explained. The hot water under pressure is forced through the mass or body of ore supported on the filter, thereby melting and washing out the sulphur, and the water and melted sulphur will pass down through the filtering medium, and through the openings 25 of the plate 23, and into the cold water in the compartment below. The melting point of sulphur is two hundred and thirty-nine degrees Fahrenheit, and the point of its greatest fluidity is two hundred and forty-eight. During the extracting process the upper portion of the pressure chamber should be kept at a temperature sufficient to melt the sulphur from the ore. This may vary with different ores, for it has been found that two hundred and fifty-six to two hundred and fifty-eight degrees Fahrenheit is sufficient. The temperature in the upper part of the chamber 10 should be kept above the melting point of sulphur, so that the sulphur will not harden in coming through the filter plate, and it has also been found that two hundred and forty-five degrees Fahrenheit is sufficient for this purpose. Falling into the cold water below, the sulphur hardens into globules or lumps, and will also, to a considerable extent, be washed and separated from any earthy matter which may be washed away from the ore and passed through the filter. As the water in the lower chamber is clean when the operation begins it readily holds in suspension the mud passing through the strainer with the melted sulphur and water. After the operation the water in the lower chamber is usually discolored in this way. Of course the water in the lower chamber can be renewed at will during the operation. During the process, the agitator shaft 13 is rotated, thereby to stir the mass of ore, and while the agitator may tend to whirl the entire mass of ore, this tendency is counteracted by the stationary arms 22 and by the cross-bar 16, in the manner previously explained. If the hot water does not pass readily through the mass of ore and the filter, either steam or hot compressed air can be forced through the pipe 40 into the top of the chamber, preferably not exceeding two hundred and sixty-six to two hundred and sixty-eight degrees Fahrenheit, thereby to force the water downwardly through the ore. Also, a pump may be used to force the hot water through the ore and the filter. As is well known, sulphur when heated to a higher temperature is liable to stiffen or become harder instead of softer, and the mixture of ore and water may show a tendency in this direction at about two hundred and seventy degrees Fahrenheit, or somewhere near this point, so that the steam or hot air should be kept below this temperature, and precautions taken to prevent the mixture from stiffening to any extent that might interfere with the proper operation of the apparatus.

After the operation has been completed, so that practically all of the sulphur has been extracted from the ore and delivered to the chilling chamber below the filter, the blow-off valve 51 is then opened and the contents of the upper section 6 are discharged as much as possible, the agitator being preferably operated at this time. Of course, the process is effective and commercial if it extracts, for example, all except about five per cent of the sulphur in the ore, but even better results than this have been obtained with this process. The water is then drawn from the section 10 by means of the cocks 60, or one of them, and the steam is allowed to escape from the upper and lower compartments by opening the valves 52 and 56, so that the internal pressure is reduced to practically atmospheric pressure. The hand-hole 39 is then opened, and the sulphur and earthy substances or other matter in the bottom of the section 10 are then washed out by water from the pipe 53, in a manner that will be readily understood. The bolts 34 are then loosened, and the upper section 6 is raised in the manner previously explained. The top of the plate 23 and the wire cloth 26 are then cleaned, preferably with a hose, and if cloth is used as a strainer, in the manner previously explained, a clean sheet of cloth is then placed on the wire screen. The cloth used for this purpose can be cleaned from time to time to keep it in proper condition for use. The section 6 is then lowered and fastened in place and the apparatus is ready for another operation. If gravel is used as a strainer, a fresh supply is placed on the filter, and by revolving the agitator, the lower arms 21 thereof will serve to level the layer of gravel on the filter so that the mass or body of ore may rest evenly thereon.

In the bottom of the section 10 will be found globules of sulphur, and perhaps some earthy matter as well, depending upon the character of the ore and the porosity of the filter, and the sulphur can be separated from the earthy substances or other matter by sifting or washing, or in any suitable manner. Obviously, however, by using a filtering medium of proper character, only the hot water and melted sulphur will pass through and fall into the cold water. Cloth has been found to be the best strainer for this purpose, but there are other things, of course, which will serve the purpose. The larger globules or lumps of sulphur are separated and saved, but any fine particles of sulphur which might remain with the dirt or earthy substances may be placed in the upper compartment of the pressure chamber, along with another body of ore, and thus melted to form globules or lumps. Also, a large quantity of what would be called dirty sulphur can be passed through the apparatus, in order to extract the sulphur therefrom, in the following manner:— After the dirt and sulphur are placed on the filter, steam can be supplied to the lower compartment, below the filter, to raise the temperature of the mass to about two hundred and fifty degrees Fahrenheit or more, which will melt the sulphur. Steam can then be admitted to the upper section 6, through the pipe 40, at a temperature of about two hundred and sixty-five degrees Fahrenheit, and this increased pressure in the upper compartment will drive the melted sulphur downwardly through the cotton cloth and wire cloth and perforated plate, and into the compartment below. In this way, therefore, if the strainer or filter does not produce fairly clean sulphur in the lower compartment, where it is chilled and agglomerated into globules, the sulphur can be allowed to accumulate and then finally cleaned by again passing it through the apparatus, and by steaming it through the filter, in the manner explained. But, as explained, it is intended to have only the water and sulphur pass through the filter, and the real purpose of the invention is to produce practically pure sulphur in the lower compartment of the apparatus, in the manner described.

The preliminary treatment of the ore will depend somewhat upon its character, of course, but ordinarily the ore should be crushed or comminuted, and it may be ground or pulverized if desired. There are different kinds of crushing or grinding machines which can be used for this purpose, such, for example, as those employed for crushing coal, but anything can be used for this purpose which will reduce the ore to small lumps or granules, thereby to facilitate the action of the hot water in melting and washing out the sulphur.

The invention involves, therefore, the use of water at some stage of the process to produce the desired effect therein. As explained, water is used, at high temperature for example, to melt the sulphur in the ore, and to soften the earthy elements of the ore, forming mud which is eliminated at some stage of the process. Also water is used to wash the melted sulphur before it congeals. In the apparatus shown the melted sulphur will pass through substantially a foot of water before it congeals, and when the strainer or filter is efficient, this affords all the washing necessary to produce a commercial product. Where the strainer is not efficient further purification of the sulphur in some way is necessary. Again, as explained, a filtering action is employed at some stage of the process to filter the sulphur in melted condition from an area under pressure to an area of less pressure, so that pressure as well as gravity serves to force the melted sulphur from one area to the other. Such a filtering action occurs when the sulphur is melted out of the ore, and also if the sulphur is remelted and steamed out of the dirt or other matter, after the chilling operation. Steam is preferably introduced directly into the relatively high pressure area, not only to furnish the necessary pressure, but also to maintain the necessary degree of heat; and, in any event, in melting the sulphur out of the ore the relatively low pressure space or chamber or area into which the sulphur is filtered does not, of course, ever supply any water to the said high pressure chamber, as such water is supplied directly to the high pressure area, and necessarily does not first pass through the area into which the melted sulphur is discharged by the filtering medium. Thus, in addition to the filtering of the melted sulphur from the one area to the other area, by pressure and gravity, there is also the use of water at some stage of the process, or at different stages, to produce the desired effect on the materials being treated. This means, of course, that water is supplied in suitable quantity to the apparatus, from a suitable source of water supply. Mud formed is eliminated, also, prior to the arrival of the melted sulphur in the relatively low pressure area below the filtering medium, the degree of elimination depending on the efficiency of the filter or strainer. The invention, therefore, is not limited to the different steps in any particular order, as the essential steps may be used in any suitable or desired order, depending upon conditions, the quality or character of the ore, and other circumstances; and it will be seen, for example, that mud is not only eliminated before the melted sulphur and some water and other matter pass into the relatively low pressure chamber, below the filtering medium 26 and 29 and below the plate 23, but also that the passing of the melted sulphur through the water until it hardens and the drawing off of the water by the devices provided for this purpose from the said lower or cooling chamber, serves to eliminate mud, inasmuch as the earthy matter or other elements held in suspension escape with the water, and thus in this case the process involves a washing action subsequent to the melting of the sulphur by which the melted sulphur is washed prior to congealing and hardening the sulphur. Water, and also steam, with the process or method shown and described, are admitted directly to the relatively high pressure area above the filtering medium, instead of being forced into this area through the filtering medium, and whereby the filtering medium is solely for the purpose of filtering the melted sulphur; and while steam may be admitted to the low pressure space below the filtering medium to keep the latter hot, it is obvious that such steam is not required to pass upwardly through the filtering medium or means, to supply the heat necessary for melting the sulphur out of the ore, inasmuch as this is done by the steam and hot water admitted directly to the chamber in which the ore mass is confined under pressure to melt the sulphur therein and to soften the mud and earthy and other like elements mixed with the sulphur in the ore. Of course, as will be readily understood, some earthy matter and small particles of insoluble matter will be held in suspension in the water. Any readily soluble substances or elements will be dissolved by the water.

Obviously, with the method shown and described, the raw ore mass and the hot water are churned about under confinement in a chamber to melt the sulphur in the ore, so that the liquid sulphur and the mud formed by the softening of the earthy matter, and the sand resulting from the agitation of the ore, or from the original breaking up of the ore, are churned out of the ore rock and into the hot water. Also, at certain times, as explained, and during cessation of the filtering operation, the filtering medium is cleaned by passing through it steam in a direction opposite to that in which the sulphur passes through the filtering medium from the chamber in which the melted sulphur was churned out of the ore rock into the water. This filtered sulphur drops down from the filtering medium, in the manner shown and described, or in any suitable or desired manner, and is followed by final recovery of the sulphur by itself, the object being to produce commercial sulphur from the raw sulphur bearing ore rock.

What I claim as my invention is:—

1. The process of extracting sulphur from a mass of sulphur bearing ore, comprising the use of hot water on the entire mass in a manner to melt the sulphur in the ore mass, and to soften any mud or earthy matter contained in the mass, filtering the water and melted sulphur away from the ore by maintaining conditions which cause the melted sulphur to accumulate at the bottom of the mass and flow by gravity from an area under pressure to an area of less pressure and through a filtering medium, and ultimately recovering the sulphur.

2. A process as specified in claim 1, comprising the chilling of the hot water and melted sulphur to form lumps or globules or particles of sulphur, thus separating the sulphur from the water.

3. A process as specified in claim 1, comprising the heating of the mass of ore by steam before mixing the ore with hot water.

4. A process as specified in claim 1, comprising the application of fluid pressure to force the hot water and melted sulphur through the mass of ore to accelerate the said filtering operation.

5. A process as specified in claim 1, comprising the chilling of the hot water and melted sulphur to form lumps or globules or small particles of sulphur, and maintaining the water and the sulphur and other matter under pressure while subject to said filtering and chilling operations.

6. A process as specified in claim 1, in which the water is maintained at a temperature of about 256 to 258 degrees Fahrenheit, or at a temperature for melting the sulphur, while passing through the mass of ore and during the filtering step, so that the sulphur will be maintained in a melted condition, and in which the final recovery is accomplished by again melting the sulphur to separate it from the other matter, substantially as described.

7. A process as specified in claim 1, in which the ore is agitated while the hot water is passing through the mass and while the filtering action is taking place below the ore.

8. The process of extracting sulphur ore, comprising the churning of the raw ore mass with a body of hot water at a temperature sufficient to melt the sulphur, so as to separate the sulphur and some other matter from the fragments of the ore mass, while keeping the liquid sulphur in a state of agitation below the ore rock, thereafter cooling the sulphur and other matter mixed therewith, thereafter melting and filtering the sulphur out of the other matter, and finally removing the sulphur, comprising the separation and removal of a substantial portion of the earthy substances from the mass, by filtering the hot water and melted sulphur through a porous medium, and away from the mud, prior to said last melting operation.

9. The process of extracting sulphur from ore, comprising the churning of the raw ore mass with a body of hot water at a temperature sufficient to melt the sulphur, so as to separate the sulphur and some other matter from the fragments of the ore mass, while keeping the liquid sulphur in a state of agitation below the ore rock, thereafter cooling the sulphur and other matter mixed therewith, thereafter melting and filtering the sulphur out of the other matter, and finally removing the sulphur, comprising the supporting of the entire mass of ore and the hot water on a porous filtering medium during the said washing operation, and maintaining a greater pressure above said medium than below during the operation, so that the melted sulphur and some hot water pass by gravity from an area under pressure to an area of less pressure.

10. A process as specified in claim 1, comprising the crushing and comminuting of the ore prior to the mixing thereof with the hot water.

11. In apparatus for extracting sulphur from ore, the combination of a pressure compartment, a filter forming an outlet for said compartment, means for introducing the sulphur ore into said compartment, and means for introducing hot water under pressure into said compartment, at a temperature sufficient to melt the sulphur, and means for receiving the hot water and melted sulphur and earthy substances forced through the ore and filter by the pressure.

12. Apparatus as specified in claim 11, said filter comprising a perforated plate, a screen on said plate, and a filtering medium spread over said screen, said plate having grooves in the surface thereof to receive the water and melted sulphur, and the perforations of the plate forming outlets leading from said grooves.

13. Apparatus as specified in claim 11, said filter being at the bottom of said compartment, a chilling compartment below said filtering means for raising and lowering the upper compartment, and means for supplying water and steam to both compartments.

14. Apparatus as specified in claim 11, in combination with an agitator for stirring the mass of ore contained in the compartment, so that the ore will be stirred while the hot water is being forced through to melt and wash out the sulphur.

15. An apparatus as specified in claim 11, said filter forming the bottom wall of said compartment, a chilling compartment below said filter, means for detachably connecting the two compartments together, means for supplying steam and water to each compartment, means for regulating the pressure and temperature, means for raising and lowering the upper compartment, and an agitator in the upper compartment to stir the mass of ore resting on said filter.

16. The process of extracting sulphur from ore, comprising the forcing of hot water into a mass of sulphur-bearing ore, thereby to melt out the sulphur, causing separation between the melted sulphur and the mud formed by earthy or other matter washed out of the ore, by flowing the melted sulphur with hot water away from the muddy ore mass, and thereafter recovering the sulphur.

17. A process as specified in claim 16, including the straining of the water and melted sulphur through a filtering medium, thereby to separate the sulphur from the water-soaked ore mass.

18. The process of extracting sulphur from ore, by means of suitable apparatus, comprising the supplying of ore in suitable quantity to said apparatus, the use of heat and a churning action to melt the sulphur in the ore, while keeping the liquid sulphur in a state of agitation when it settles from the ore rock, transferring the sulphur at some stage of the process from an area under pressure to an area of less pressure, by filtering the sulphur in liquid condition from one area to the other, supplying water in suitable quantity to said apparatus, the ore and water being introduced separately, using said water at some stage to facilitate the process, ultimately recovering the sulphur, said water softening the mud or earthy matter or other similar elements of the ore, and holding them in suspension, thereby washing the sulphur free of impurities.

19. The process of extracting sulphur from ore, by means of suitable apparatus, comprising the supplying of ore in suitable quantity to said apparatus, the use of heat and a churning action to melt the sulphur in the ore, while keeping the liquid sulphur in a state of agitation when it settles from the ore rock, transferring the sulphur at some stage of the process from an area under pressure to an area of less pressure, by filtering the sulphur in liquid condition from one area to the other, supplying water in suitable quantity to said apparatus, the ore and water being introduced separately, using said water at some stage to facilitate the process, and ultimately recovering the sulphur, wherein mud is produced by said water and eliminated prior to said filtering action.

20. The process of extracting sulphur from ore, comprising the forcing of hot water into a mass of sulphur-bearing ore, thereby to melt out the sulphur, causing separation between the melted sulphur and the mud formed by earthy or other matter washed out of the ore by flowing the melted sulphur with hot water away from the muddy ore mass, and thereafter recovering the sulphur, including the straining of the melted sulphur through a filtering medium, thereby to separate the sulphur from the water-soaked ore mass.

21. The process of extracting sulphur from ore, comprising the washing of the ore mass with hot water at a temperature sufficient to melt the sulphur, so as to separate the sulphur and some other matter from the ore mass, cooling the sulphur and other matter mixed therewith, thereafter melting and filtering the sulphur out of the other matter, and finally recovering the sulphur, comprising the separation and removal of a substantial portion of the earthy substances from the mass, by filtering the hot water and melted sulphur through a porous medium, and away from the mud, prior to said last melting operation.

22. The process of extracting sulphur from ore, comprising the washing of the ore mass with hot water at a temperature sufficient to melt the sulphur, so as to separate the sulphur and some other matter from the ore mass, cooling the sulphur and other matter mixed therewith, thereafter melting and filtering the sulphur out of the other matter, and finally recovering the sulphur, comprising the supporting of the entire mass of ore and the hot water on a porous filtering medium during the said washing operation, and maintaining a greater pressure above said medium than below during the operation, so that the melted sulphur and some hot water pass by gravity from an area under pressure to an area of less pressure.

23. The process of producing commercial sulphur from raw sulphur bearing ore, comprising the churning of the raw ore mass with a body of hot water confined in a chamber until the heat of the water has melted the sulphur out of the fragments of the ore, causing the earthy matter to be softened and reduced to mud, so that the liquid sulphur and mud and sand are churned out of the ore rock into the hot water, thereafter discharging the sulphur in a condition substantially free of mud from said chamber, and finally recovering the sulphur by itself.

WILLIAM P. THORNTON.